United States Patent

Doany et al.

Patent Number: 5,517,340
Date of Patent: May 14, 1996

[54] HIGH PERFORMANCE PROJECTION DISPLAY WITH TWO LIGHT VALVES

[75] Inventors: Fuad E. Doany, Katonah, N.Y.; Donis G. Flagello, Heeze, Netherlands; Alan E. Rosenbluth, Yorktown Heights, N.Y.

[73] Assignee: International Business Machines Corporation, Armonk, N.Y.

[21] Appl. No.: 380,877

[22] Filed: Jan. 30, 1995

[51] Int. Cl.⁶ .............................. G02F 1/133; H04N 9/12
[52] U.S. Cl. ................... 359/41; 359/40; 359/63; 348/742; 348/743
[58] Field of Search ..................... 348/766, 781, 348/782, 742, 743; 353/84, 31, 8, 20; 359/40, 41, 63

[56] References Cited

U.S. PATENT DOCUMENTS

| | | | |
|---|---|---|---|
| 4,090,219 | 5/1978 | Ernstoff et al. | 348/742 |
| 4,343,535 | 8/1982 | Bleha, Jr. | 359/41 |
| 4,758,818 | 7/1988 | Vatne | 345/151 |
| 4,786,146 | 11/1988 | Ledebuhr | 359/39 |
| 4,991,941 | 2/1991 | Kalmanash | 359/64 |
| 5,028,121 | 7/1991 | Baur et al. | 359/40 |
| 5,111,315 | 5/1992 | Ledebuhr | 359/40 |
| 5,463,433 | 10/1995 | Koo | 359/68 |

FOREIGN PATENT DOCUMENTS

0435288A1  7/1991  European Pat. Off. .

Primary Examiner—Anita Pellman Gross
Assistant Examiner—Fetsum Abraham
Attorney, Agent, or Firm—Scully, Scott, Murphy & Presser

[57] ABSTRACT

A simplified two-light valve configuration for high performance projection displays which eliminates much complexity and the costs associated with three-light valve projection displays, such as a crossed dichroic beam splitter cube, a long retrofocus projections lens, and the additional cost and complexity of a third light valve. Two reflective liquid crystal light valves are positioned and aligned relative to each other on two adjacent surfaces of a polarizing beam splitter cube. Illumination is introduced through a third face of the cube, and a projection lens images the two light valves through a fourth surface of the polarizing beam splitter cube. Color-sequential and alternating polarization states are provided by a color filter wheel or cage containing individual facets of dichroic or color glass filters, such that as the wheel or cage rotates, the filters change and produce sequential red, green and blue outputs. In addition, the polarization of adjacent colors is alternated by adding a polarizing film onto each color filter.

20 Claims, 3 Drawing Sheets

HIGH PERFORMANCE PROJECTION DISPLAY WITH TWO LIGHT VALVES

BACKGROUND OF THE INVENTION

Field of the Invention

The present invention relates generally to a high performance projection display with two light valves, and more particularly pertains to a simple optical configuration therefor using two liquid crystal light valves in a high resolution full color video display. The simple arrangement eliminates the requirement for a third light valve, and also eliminates the requirement for complicated optical components such as dichroic beam splitters and large retrofocus projection lenses.

Discussion of the Prior Art

Prior art high performance projection displays based upon liquid crystal technology require three light valves (spatial light modulators), one for each of the primary colors. In addition, typical prior art projection displays require several complicated and costly optical components positioned between the light valves and the projection lens. In particular, the components between the light valves and the projection lens normally include dichroic beam splitters necessary for color separation and polarizing beam splitters necessary for light valve operation, which are typically large and complicated optical components. Prior art projection systems using this configuration also require retrofocus lenses with a working distance much larger than the focal length to accommodate the aforementioned large and complicated optical components, and such retrofocus lenses are complicated and costly.

In projection displays such as optical monitors, an image from an active device, such as a spatial light modulator, is projected onto a screen at a desired magnification. As the size of the active device is decreased, a reflecting spatial light modulator (SLM) is required to obtain good contrast from the system. For color images, images in three primary colors obtained from three spatial light modulators are simultaneously projected and superposed onto the screen. The optics used to generate color images in this manner typically consist of a color separation/combining prism set and a polarizing beam splitting cube. The color separation/combining prism set and the polarizing beam splitting cube are positioned between the projection lens and the spatial light modulators, and the optical path through this assembly winds up being at least 150 mm for a 35 mm×35 mm spatial light modulator, and may be as large as 200 mm depending upon the geometry of the optics.

In addition, the spatial light modulators work at best efficiencies with light being incident thereon at substantially normal incidence over a finite conical angle. The polarizing beam splitting cube must operate over the full visible spectrum and also over this finite conical angle. This also constrains the projection lens to operate with light reflecting from the spatial light modulators in essentially a normal incidence mode, which amounts to having a projection lens which is designed for a telecentric mode on the SLM side and for a rather large working distance in glass.

Such projection lenses are quite expensive, and may not be very practical because the required asymmetry results in a significantly higher amount of residual lateral color, causing a lack of convergence of the three primary color images, which increases linearly outward from the center of the image. Essentially, the three different wavelengths of the three primary colors have slightly different magnifications resulting in chromatic aberration and an imperfect overlap at the edges of the images.

In addition, with a normal projection lens, with the color combining/separating prism set and the polarizing beam splitter being positioned between the spatial light modulator and the projection lens, an inordinately large number of interface surfaces are introduced, which makes ghost images and veiling glare very difficult problems to solve by baffling. The large number of interface surfaces between the projection lens and the spatial light modulator produce multiple reflections (ghost images) and scattered light.

Single light valve configurations are also known in the prior art in which the three primary colors are sequentially displayed. The optical configuration of a single light valve system is very simple, incorporating only a polarizing cube between the light valve and the projection lens. The light valve is positioned on one side of the polarizer cube, and white light illumination is supplied through another side of the polarizer cube. Color is obtained by cycling R, G, B at 3×normal rate (3×60 Hz=180 Hz), with the eyes integrating the three fast images to form a single composite color image. Unfortunately, the light valve must operate at three times the normal rate, and the slow refresh/response times of present state of the art liquid crystal display technology rule out this configuration for high performance displays having full color at video rates.

A problem exists in that the liquid crystal switching time of the light valve is not fast enough to operate at ≧180 Hz. Moreover, the electronics requirements become substantial and costly, particularly for a high number of pixels and a large number of gray levels. Moreover, since only one primary color is projected at one time $2/3$ of the light is not used, which is in addition to $1/2$ not used because of the polarization requirements. Moreover, it takes a finite time to switch the liquid crystal light valve from one state to another (one color to another color), and accordingly the system requires dead time (no light) after each color, resulting in less than $1/3$ efficiency.

SUMMARY OF THE INVENTION

Accordingly, it is a primary object of the present invention to provide a high performance projection display using two light valves.

A further object of the subject invention is the provision of a high performance projection display using two reflective light valves which has a simple optical configuration similar to a single light valve design, but without a limitation on performance caused by slow liquid crystal refresh/response times as in a single light valve system.

In contrast to the typical prior art single light valve system with its disadvantages as noted hereinabove, in a high performance projection display using two light valves pursuant to the present invention, each of the two light valves operates at only 90 Hz (not 180 Hz). Moreover, no dead time is required after each color. While one light valve is "on", the second is "off" (not illuminated) and therefore has an entire half period ($1/180$ seconds) to change its liquid crystal state. During any half period, one or the other light valve is projected so that a full tricolor frame is projected in three half periods ($1/60$ seconds).

In accordance with the teachings herein, the present invention provides a two-light valve configuration in a simplified optical system for high performance projection displays. The simplified arrangement eliminates much complexity and costs associated with three-light valve projection displays, such as a crossed dichroic beam splitter cube, a long retrofocus projection lens, and the additional cost and complexity of a third light valve.

In accordance with the teachings herein, the present invention provides an apparatus for selectively directing a plurality of color components of light from a light source into a plurality of different directions. Initially, light from the light source is separated into the plurality of color components and also into different polarization states, and then each of the plurality of color components is directed into the plurality of different directions based upon the different polarization states. Each of the plurality of colors is alternated while sequentially alternating the colors between different polarization states.

The present invention also provides a projection display system having a projection lens, first and second light valves, and a polarizing beam splitter. The polarizing beam splitter transmits a portion of a light beam to illuminate one light valve through the transmission port and reflects a portion of a light beam to operate the other light valve via the reflection port. The system projects a color and polarization sequence of illumination of three colors, wherein any two sequential colors have perpendicular polarization states.

In greater detail, the light valves preferably comprise reflective liquid crystal spatial light modulators, and the three colors comprise red, green and blue. During operation, only one of the light valves is imaged at a time, with the illumination being alternated from one light valve to the other light valve, such that while one light valve is illuminated and imaged by a projection lens, the other light valve is dark while it is being reconfigured for the next color image. The two light valves are alternated between by alternating the polarization of the incoming illumination source, such that the polarizing beam splitter cube directs light onto only one light valve at a time.

In one embodiment, the illumination sequence between three colors designated C1, C2 and C3, and two perpendicularly polarized states designated s and p, wherein one polarization state s illuminates and operates one light valve and the other polarization state p illuminates and operates the other light valve, is C1-s, C2-p, C3-s, C1-p, C2-s, C3-p. In another embodiment, the illumination sequence is C1-s, C2-p, C3-s and C2-p. In yet another embodiment, one color C1 is always projected with the light valve illuminated in transmission, a second color C2 with the light valve illuminated in reflection, and a third color C3 is alternated between illumination in reflection and illumination in transmission. A C1-suppressing filter is placed in the reflection path, and a C2-suppressing filter is placed in the transmission path. In a further embodiment, a polarization filter is synchronized with the alternating polarization of the illumination to match the polarization reflected from bright pixels, and to block residual light from dark pixels that is incompletely suppressed by the polarizing beam splitter.

In a further embodiment, a cylindrical cage color and polarization wheel has a color/polarization sequence of C1-s, ½ C2-p, C3-s, ½ C2-p.

A further embodiment includes a color filter, which passes C1 and C2 but rejects C3, positioned in front of the light valve illuminated in reflection with s polarized light. The s-illuminated light valve alternately projects the C1 and C2 images, and light in the C1 and C2 images returns to the beam splitter as p polarization from bright pixels and as s polarization from dark pixels. In a further embodiment, successive three-color video frames are projected with the sequence C1-p, C2-s, C3-p; C2-s, C1-p, C3-s.

In a further embodiment, p polarized video frames contain the color components of, for example, the left eye's image of a stereo view, while s polarized frames project the right eye's image. The sequence is, for example, C1-s-right, C2-p-left, C3-s-right, C1-p-left, C2-s-right, C3-p-left.

The present invention also provides a time sequential projection system to project rapid-rate video images which includes first and second light valves, and beam splitting and combining optics to deliver light from either of the first and second light valves to a projection lens. An illumination subsystem sequentially projects beams of different primary colors onto the first and second light valves, with each light valve alternately projecting a single color component of a frame while the other light valve is being reset for the next color component. In greater detail, the illumination subsystem sequentially switches the illuminating beams of different colors into an alternating sequence of polarization states which include orthogonal linear s and p states. The beam splitting and combining optics include a polarizing beam splitter, positioned between the illumination subsystem and the first and second light valves, for directing input illumination light of a first polarization state to one light valve and of a second polarization state to the other light valve. The beam splitting and combining optics direct output light projected from bright-switched light valve pixels to the projection lens, while diverting light from dark-switched pixels.

BRIEF DESCRIPTION OF THE DRAWINGS

The foregoing objects and advantages of the present invention for a high performance projection display using two light valves may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
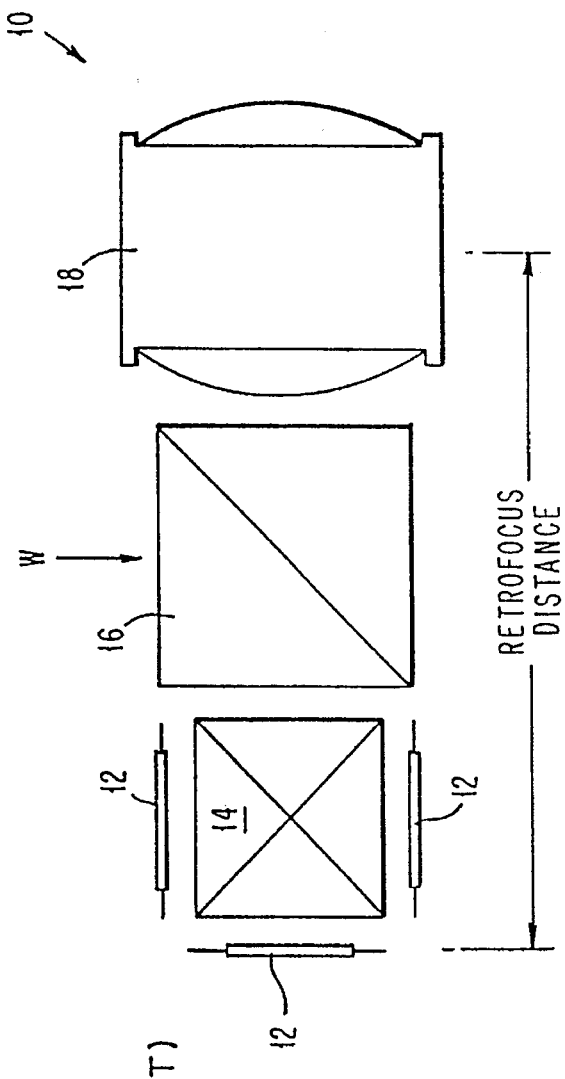
FIG. 1 illustrates a somewhat simplified typical prior art configuration for a three-light valve projection display.

Referring to the drawings in detail, FIG. 1 illustrates a somewhat simplified typical prior art embodiment of a three-light valve projection display system 10. The projection display system 10 includes three liquid crystal reflective light valves (spatial light modulators) 12 positioned on three surfaces of a crossed dichroic beam splitter cube 14, a polarizing beam splitter cube 16, and a projection lens 18. White light illumination W is introduced through one face of the polarizing beam splitter cube 16 which passes (reflects) one polarized Component thereof into the crossed dichroic beam splitter cube 14. The dichroic beam splitter cube 14 then separates the polarized white light into red, green and blue components.

Each color component is incident upon a liquid crystal reflective light valve 12 which rotates the polarization of the light to produce the required image, in a manner as is known in the art. The three reflected perpendicularly polarized images are then recombined in the dichroic beam splitter cube 14 and pass back through the polarizing beam splitter cube 16 to the projection lens 18. As illustrated at the bottom of FIG. 1, with this prior art approach the projection lens 18 requires a very large working distance (retrofocus distance). Replacing the dichroic beam splitter cube 14 with individual plate beam splitters only increases this long retrofocus distance. This required working distance makes it difficult to design projection lenses with short lens-to-screen distances, such as those required for desk top projection displays.

In the operation of a typical prior art reflective liquid crystal light valve as illustrated in FIG. 1, p illumination is passed by the polarizing beam splitter cube 16 through the dichroic beam splitting cube 14 to illuminate the reflective liquid crystal light valves 12. Each pixel of each light valve is selectively driven by a voltage to selectively rotate the polarization of the reflected radiation, such that the p polarization is selectively reflected by the light valve as s polarization back through the polarizing beam splitter cube to the projecting optics. Light in these images returns to the beam splitter as p polarization from bright pixels and as s polarization from dark pixels.

The dichroic beam splitter prism 14 contributes two tilted optical surfaces to the imaging path, each seen twice in reflection through an n≡1.5 medium. Though each diagonal surface is split between two subprisms, the two sections must be aligned simultaneously at the seam in such a way as to form a unified surface capable of reflecting an optical quality imaging wavefront. This fabrication requirement makes the dichroic beam splitter cube quite expensive.

Figure 2:
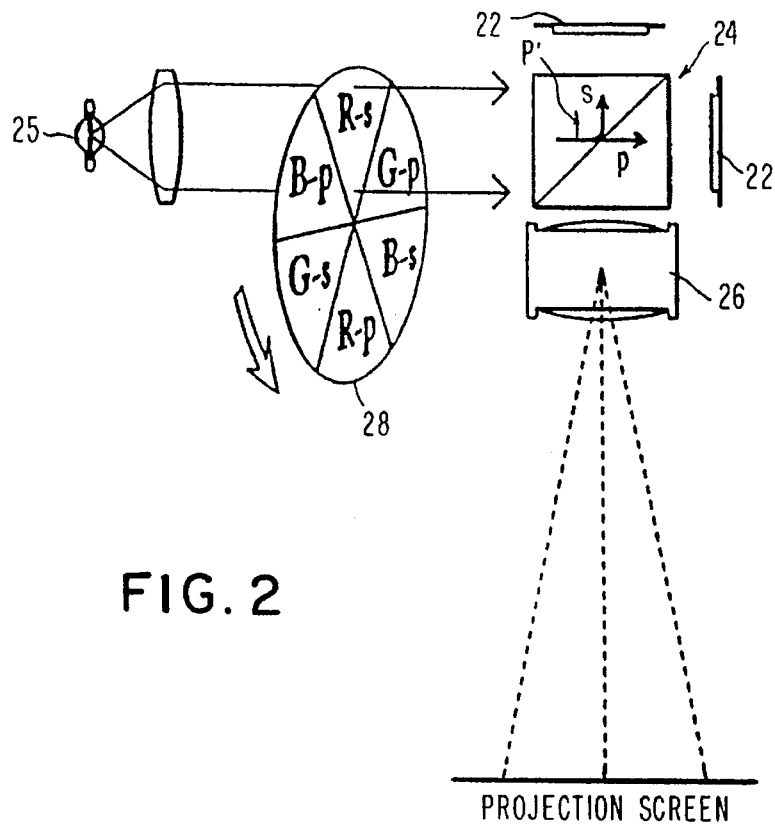
FIG. 2 is an elevational view of an exemplary embodiment of a high performance projection display using two light valves constructed pursuant to the teachings of the present invention.

FIG. 2 illustrates a typical configuration of a two-light valve high performance projection display pursuant to the teachings of the present invention. The two-light valves 22 are placed on two adjacent faces of a polarizing beam splitter cube 24. White light illumination from a source 25 is introduced through a third face of the polarizing beam splitter cube 24, while a projection lens 26 images the light valves through a fourth face of the cube.

Similar to single light valve systems, the illumination is of the color sequential type. That is, the three primary colors red (R), green (G) and blue (B) are introduced through color wheel 28 one at a time at three times the normal operational rate of approximately 60 Hz. However, whereas a single light valve arrangement is not adequate for desired performance at these high refresh rates, the present invention is adequate to produce high performance projection displays. Since, for this system, only one light valve 22 is imaged at a time, the illumination is alternated from one light valve to the other. Thus while one light valve 22 is illuminated and imaged by the projection lens, the second light valve 22 is dark while it is being reconfigured for the next color image. Alternating between the two light valves is accomplished by alternating the polarization (s-p-s-p . . . ) of the incoming illumination source. With polarized light coming in, the polarizing beam splitter cube directs light onto only one light valve at a time.

The illumination sequence is thus:

R-s, G-p, B-s, R-p, G-s, B-p . . .

where s and p denote the two perpendicularly polarized states of the illumination, each assigned to one of the two light valves.

The embodiment of FIG. 2 is quite cost effective and inexpensive relative to the three light valve embodiment of FIG. 1 in that it does not require a dichroic beam splitter, uses only two light valves instead of three, and allows the use of a lens with a shorter back focal length. The polarizing beam splitter 24 remains a fairly expensive item. For a mid-performance system (e.g., 0.5 NA and >40:1 contrast between white and black pixels), appropriate polarization requirements in the polarizing beam splitter 24 might typically be met by an interference coating not constrained to operate at 45°, accepting as a trade-off that the prisms become more expensive. For a high performance system (e.g., 0.1 NA and >100:1 white-to-black contrast), the coating requirements in the polarizing beam splitter 24 may push the present state of the art.

Specifically, at present it is difficult to obtain a polarizing beam splitter in which the reflectance in p polarized light is reduced below ~10%, averaged over a lens NA of 0.1. (Good rejection of s polarization in transmission is much easier to achieve.) This residual p polarization in the reflected light, shown as p' in FIG. 2, causes a loss of contrast in the resultant image.

Figure 3:
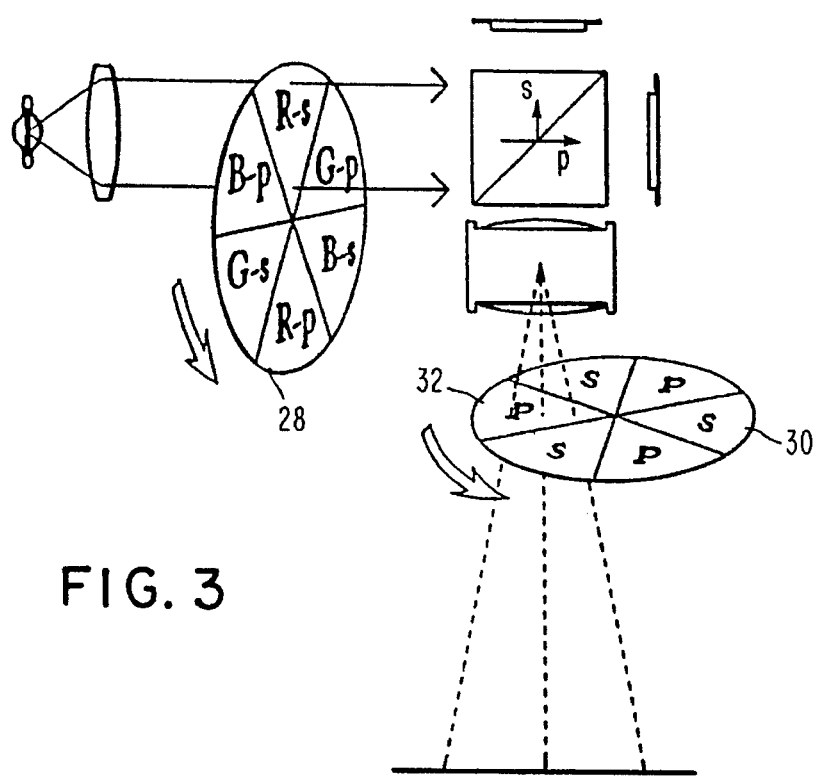
FIG. 3 illustrates an embodiment of the present invention wherein light which is misreflected by the polarizing beam splitter is filtered from the image with a time-switched polarization filter in the imaging train that alternately passes s and p types of polarization.

FIG. 3 illustrates an embodiment of the present invention wherein light which is misreflected by the polarizing beam splitter is filtered from the image with a polarization filter 30 in the imaging train that alternately passes s and p types of polarization. This polarization filter is synchronized with the alternating polarization of the illumination in such a way as to match the polarization reflected from the bright pixels, and to block residual light from the dark pixels that is incompletely suppressed by the polarizing beam splitter. Note that in FIG. 3, the color and polarization wheel 28 is passing s polarity radiation which is reflected onto the light valve 22. The light valve 22 reflects the light in bright pixels in the image as p polarity radiation (rotates the polarity by 90°) which is then passed by the p polarity segment 32 of filter 30, while the p polarity segment 32 suppresses the s polarity radiation in dark pixels in the image. The embodiment of FIG. 3 becomes preferable to the embodiment of FIG. 2 when the cost of a polarizing beam splitter that can itself provide sufficient contrast exceeds the combined cost of a lower performance beam splitter and image train filter.

Figure 4:
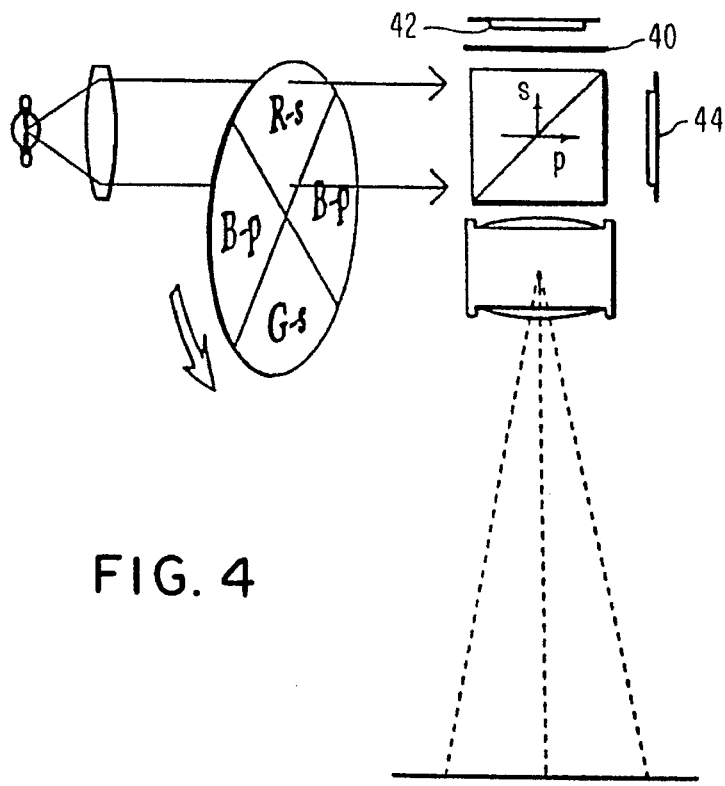
FIG. 4 illustrates another embodiment of the present invention for accommodating relaxed reflection-pass performance of a polarizing beam splitter wherein additional clean-up filtration is accomplished with a static color filter rather than a time-switched polarization filter.

FIG. 4 illustrates another embodiment of the present invention for accommodating relaxed reflection-pass performance of the polarizing beam splitter when two light valves are used. In this embodiment, clean-up filtration is accomplished with a static color filter 40 rather than a time-switched polarization filter as in FIG. 3. This color filter 40 passes red and green light, but rejects blue light (i.e., the filter is yellow), and is positioned in front of the light valve that is illuminated in reflection with s polarized light. The s-illuminated light valve 42 is used to alternately project the red and green images; light in these images returns to the beam splitter as p polarization from bright pixels and s polarization from dark pixels. Even a beam splitter of modest cost will pass the former and reject the latter with very high contrast (in transmission). During the time in which the light valve is being reset from red to green (and cannot project a proper image), the illumination is switched to p polarized blue light in order to project the blue image from the second light valve 44 (dedicated to blue). Imperfect reflection contrast in the beam splitter causes a small part of this p polarized light to illuminate the red/green light valve. Were it not for the color filter 40, some of this p light would be projected to the image from pixels that are nominally dark in the red and/or green frames, reducing image contrast.

The polarizing beam splitter need only suppress contrast loss in the blue image to the point that an adequate contrast is achieved in the final screen image. This is not a very stringent requirement because the blue channel contributes relatively little luminosity to the final image, due essentially to idiosyncrasies of the human visual system. For example, suppose that green, red and blue primaries meeting the NTSC video standard are obtained by filtering an equal-energy illuminant into three spectral bands, 500–567 nm, 591–680 nm, and 433–500 nm, respectively, with relative attenuation 70:78:100. In this case, the blue channel has only 19% of the luminosity in the green channel and only 11% of the luminosity in full white. In intuitive terms, a "navy blue" pixel looks more like a black pixel than do the dark shades of the other colors. Thus, if the beam splitter produces 10% residual p reflectance in the nominally black pixels during blue image projection, the luminance in the screen image is only 1.1% that of full white. Though these numbers ignore subtle technical differences between the colorimetric phenomena of brightness and luminance, they illustrate the strong contrast advantage from operating the blue channel in transmission, as in the FIG. 4 embodiment.

Contrast can be increased further by appropriate design of the polarizing beam splitter coating, since the supplementary filtering in the FIG. 4 arrangement allows coating contrast in the red and green spectral regions to be traded off for improvement in the blue.

The illumination sequence in the FIG. 4 embodiment is thus:

R-s, B-p, G-s, B-p . . .

Since each cycle contains four frames, the light valve must be configured to reset more rapidly than in the embodiments of FIGS. 2 and 3, but reset can be slower than required by a single light valve. Dedication of two frames to blue provides a compensating efficiency advantage when blue is under-represented in the source spectrum. In the case of the equal energy source discussed above, green has to be attenuated by 0.7 relative to blue in order to reproduce the NTSC-specified Illuminant-D65. Moreover, computer users typically prefer a higher blue proportion.

Figure 5:
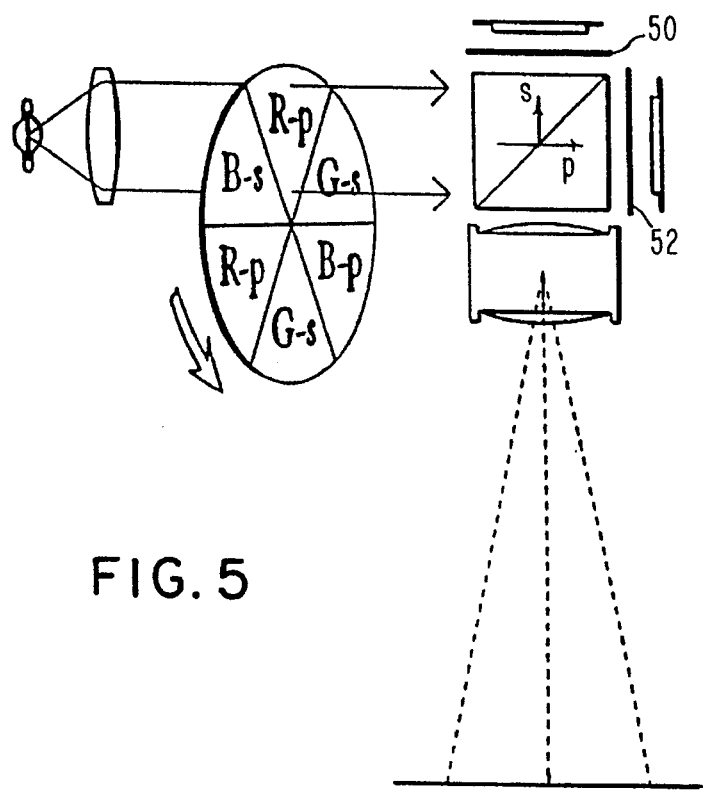
FIG. 5 illustrates a further embodiment of the present invention which uses a similar color filtering principle of operation in an embodiment which requires only three frames per cycle, wherein one color such as red is always projected with the light valve illuminated in transmission, one color such as green is always projected with the light valve illuminated in reflection, while one color such as blue is alternated between the two.

FIG. 5 illustrates a further embodiment of the present invention which uses a similar color filtering principle of operation in an embodiment which requires only three frames per cycle. In this embodiment, red is always projected with the light valve illuminated in transmission, green with the light valve illuminated in reflection, while blue is alternated between the two. A red-suppressing filter (cyan) 50 is placed in the reflection path and a green-suppressing (magenta) filter 52 is placed in the transmission path. Two successive three-color video frames would thus be projected with the sequence R-p,G-s,B-p;G-s,R-p,B-s so that each full color video frame requires only three light valve frames. For a polarizing beam splitter with a given performance, the image contrast in this configuration would be considerably better than in the embodiment of FIG. 2, although not as good as in the embodiments of FIGS. 3 and 4. Using a single light valve configuration as a reference, the embodiments of FIGS. 2, 3 and 5 allow roughly a 2×increase in light valve switching time, while the FIG. 4 embodiment allows a 50% increase in light valve switching time.

Figure 6:
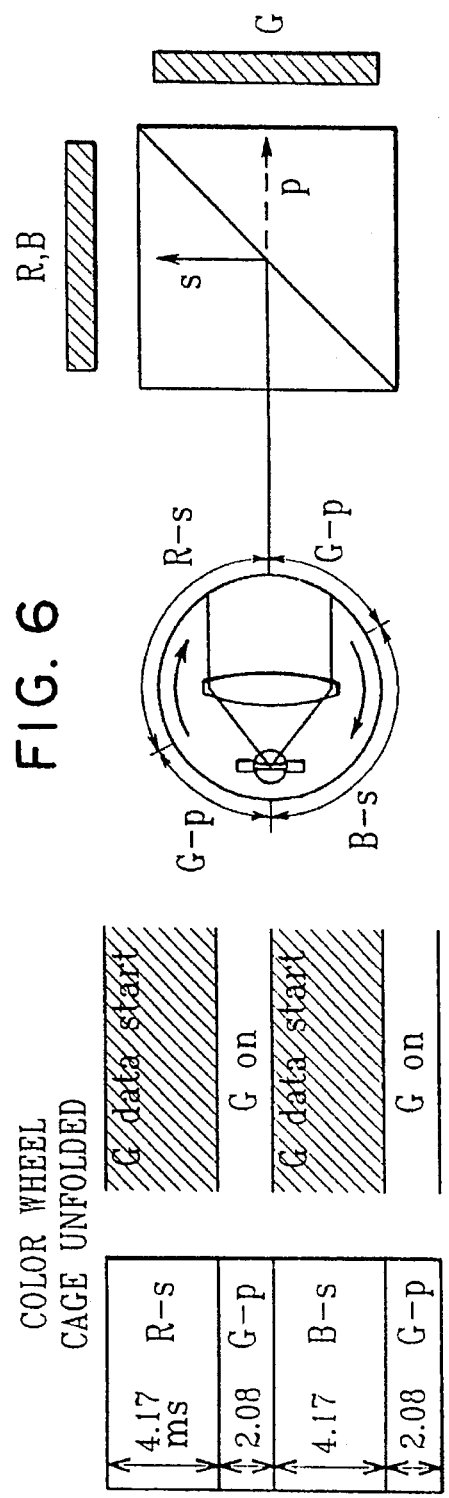
FIG. 6 illustrates a further exemplary embodiment of the present invention which utilizes a cylindrical (squirrel cage) color wheel having a color/polarization sequence of R-s, 1/2 G-p, B-s, 1/2 G-p.

FIG. 6 illustrates a further exemplary embodiment of the present invention which utilizes a cylindrical (squirrel cage) color wheel 60 having a color/polarization sequence of R-s, 1/2 G-p, B-s, 1/2 G-p. No dead band time is required with this embodiment. For 80 Hz operation, the G channel speed is 80 Hz, and the R, B channel speed is 160 Hz.

Moreover, embodiments of the present invention are also possible which combine the individual features of the several different disclosed embodiments, for instance the synchronized polarization filter of the embodiment of FIG. 3 could be utilized in the embodiments of FIGS. 4 and 5, and likewise for the other embodiments.

While several embodiments and variations of the present invention for a high performance projection display with two light valves are described in detail herein, it should be apparent that the disclosure and teachings of the present invention will suggest many alternative designs to those skilled in the art.

Having thus described the invention, what is claimed as new and desired to be secured by Letters Patent is:

1. Apparatus for selectively directing a plurality of color components of light from a light source into a plurality of different directions, comprising:

means for separating light from the light source into the plurality of color components and also into different polarization states; and means for directing each of the different polarization states and plurality of color components into said plurality of different directions.

2. Apparatus according to claim 1, further including means for alternating each of said plurality of colors, and for sequentially alternating the colors between different polarization states.

3. A projection display system having first and second light valves, a polarizing beam splitter wherein the polarizing beam splitter transmits a portion of a light beam to operate one light valve only in transmission and reflects a portion of the light beam to operate the other light valve only in reflection, a projection lens, and means for projecting a color and polarization sequence of illumination of three colors, wherein any two sequential colors have perpendicular polarization states.

4. A projection display system according to claim 3, wherein said light valves comprise reflective liquid crystal light valves.

5. A projection display system according to claim 3, wherein said three colors comprise red, green and blue.

6. A projection display system according to claim 3, wherein only one of the first and second light valves is imaged at a time, with the illumination being alternated from one light valve to the other light valve, such that while one light valve is illuminated and imaged by a projection lens, the other light valve is dark while it is being reconfigured for the next color image, and the two light valves are alternated between by alternating the polarization of the incoming illumination source, and the polarizing beam splitter cube directs light onto only one light valve at a time.

7. Apparatus according to claim 3, wherein the illumination sequence between three colors designated C1, C2 and C3, and two perpendicularly polarized states designated s and p, with one polarization state s illuminating and operating one light valve and the other polarization state p illuminating and operating the other light valve, is C1-s, C2-p, C3-s, C1-p, C2-s, C3-p.

8. Apparatus according to claim 7, wherein the light valve illuminated in s polarization projects a first image of a stereo pair of images, and the light valve illuminated in p polarization projects a second image of a stereo pair of images.

9. Apparatus according to claim 3, wherein the illumination sequence between three colors designated C1, C2 and C3, and two perpendicularly polarized states designated s and p, with one polarization state s illuminating and operating one light valve and the other polarization state p illuminating and operating the other light valve, is C1-s, C2-p, C3-s and C2-p.

10. Apparatus according to claim 3, wherein one color is always projected with the light valve illuminated in transmission, a second color with the light valve illuminated in reflection, and a third color is alternated between illumination in reflection and illumination in transmission.

11. Apparatus according to claim 3, wherein a polarization filter is synchronized with the alternating polarization of the illumination to match the polarization reflected from bright pixels, and to block residual light from dark pixels that is incompletely suppressed by the polarizing beam splitter.

12. Apparatus according to claim 3, including a cylindrical cage color and polarization wheel.

13. Apparatus according to claim 12, wherein the cylindrical cage color and polarization wheel has a color/polarization sequence between three colors designated C1, C2 and C3, and two perpendicularly polarized states designated s and p, with one polarization state s illuminating and operating one light valve and the other polarization state p illuminating and operating the other light valve, of C1-s, 1/2 C2-p, C3-s, 1/2 C2-p.

14. Apparatus according to claim 3, wherein three colors are designated C1, C2 and C3, and including a color filter, which passes C1 and C2 but rejects C3, positioned in front of the light valve illuminated in reflection with s polarized light, and the s-illuminated light valve alternately projects the C1 and C2 images, and light in the C1 and C2 images returns to the beam splitter as p polarization from bright pixels and as s polarization from dark pixels.

15. Apparatus according to claim 3, wherein three colors are designated C1, C2 and C3, and wherein C1 is always projected with the light valve illuminated in transmission, C2 is always projected with the light valve illuminated in reflection, while C3 is alternated between illumination in transmission and illumination in reflection.

16. Apparatus according to claim 15, wherein a C1-suppressing filter is placed in the reflection path, a C2-suppressing filter is placed in the transmission path.

17. Apparatus according to claim 16, wherein two successive three-color video frames are projected with the sequence C1-p, C2-s, C3-p; C2-s, C1-p, C3-s.

18. A time sequential projection system to project rapid-rate video images, comprising:
   a) first and second light valves, and beam splitting and combining optics to deliver light from either of said first and second light valves to a projection lens;
   b) an illumination subsystem for sequentially projecting beams of different primary colors onto the first and second light valves, with each light valve alternately projecting a single color component of a frame while the other light valve is being reset for the next color component.

19. A projection system as in claim 18, wherein:
   a) said illumination subsystem includes means for sequentially switching said illuminating beams of different colors into an alternating sequence of polarization states;
   b) said beam splitting and combining optics include a polarizing beam splitter, between the illumination subsystem and the first and second light valves, for directing input illumination light of a first polarization state to one light valve and of a second polarization state to the second light valve; and
   c) said beam splitting and combining optics directs output light projected from brightswitched light valve pixels to said projection lens, while diverting light from dark-switched pixels.

20. A projection system as in claim 19, wherein said different polarization states include orthogonal linear s and p polarization states.

* * * * *